W. L. Starr.
Animal-Trap.
No. 76,289.             Patented Mar. 31, 1868.
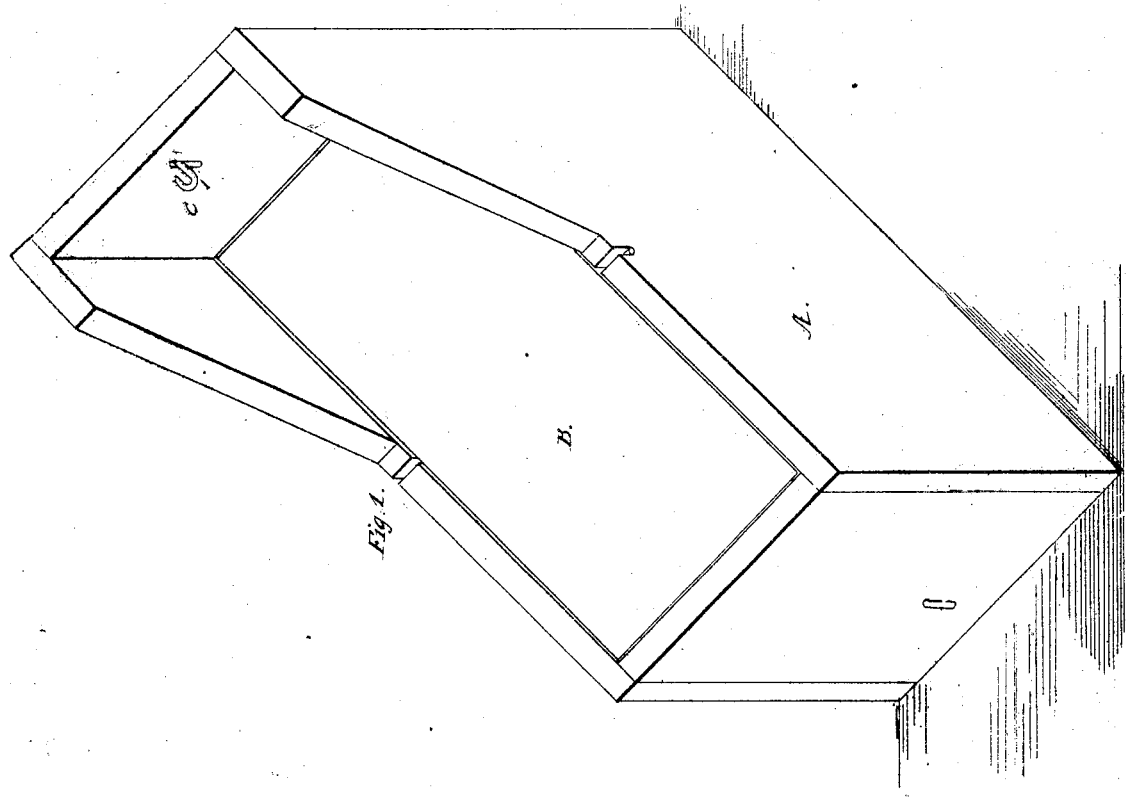
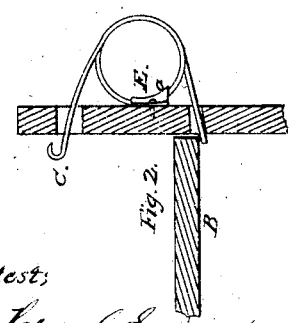
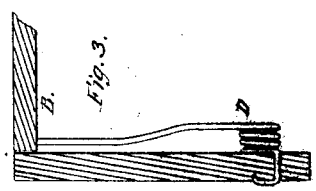
Attest:
Henry C. Sergeant
John Shirt
William L. Starr

United States Patent Office.

WILLIAM L. STARR, OF COLUMBUS, OHIO.

Letters Patent No. 76,289, dated March 31, 1868.

IMPROVED ANIMAL-TRAP.

The Schedule referred to in these Letters Patent and making part of the same.

Be it known that I, WILLIAM L. STARR, of Columbus, county of Franklin, and State of Ohio, have invented a new and useful Improvement in Animal-Traps; and I do hereby declare that the following is a full, clear, and exact description of the construction and operation of the same, reference being had to the annexed drawings, making a part of this specification, in which—

Figure 1 is a perspective view of the trap.

Figure 2 is a part section of the shield and revolving door, showing the trigger and spring-catch.

Figure 3 is a section of the box and revolving door, showing the spring for supporting the revolving door whilst the animal is passing over to the trigger.

To enable others skilled in the art to make and use my invention, I will proceed to describe its construction and operation.

Letter A is shown, in fig. 1, as the box with one end carried up above the other as a shield or protection for the bait, so arranged as to compel the animal to go on to the pivoted door in order to get the bait. Letter B represents the door, which revolves upon two pivots or centres, and nicely balanced. C represents the trigger, to which the bait is to be attached. The trigger and catch, or support for one end of the door, is made of one piece of wire E, with one or more coils, as shown in fig. 2, fastened to the side of the box or shield, by means of a small piece of elastic, $a$, which holds it firmly to its place, and brings the catch back to its place after the door has been dropped. Letter D, shown in fig. 3, represents the mode of constructing the spring, so as to offer the least obstruction to the door when revolving.

The operation: The bait is placed upon the trigger C, and the animal walks on the trap-door B, in order to get at the bait, the spring D supporting the door whilst the animal is going on. When the trigger is pulled, the catch, shown in fig. 2, for supporting the door, is pulled back, and the weight of the animal revolves the door and discharges at the bottom; the door passing around one half circle, and setting itself ready for the next.

What I claim as new, and desire to secure by Letters Patent, is—

The substitution, in a box-trap, A, of a single wire coil, E, retained by a yielding connection, $a$, and having its two ends free and pointing inwards, one to hold and release the revolving platform, and the other for the bait, in place of the ordinary pivoted lever, and all operating together substantially as herein described.

WILLIAM L. STARR.

Witnesses:
HENRY C. SERGEANT,
JOHN SHORT.